US011836893B2

(12) United States Patent
Jen et al.

(10) Patent No.: US 11,836,893 B2
(45) Date of Patent: Dec. 5, 2023

(54) ONLINE AI SUPER RESOLUTION ENGINE AND OPERATIONS

(71) Applicant: MediaTek Inc., Hsinchu (TW)

(72) Inventors: Cheng Lung Jen, Hsinchu (TW);
Pei-Kuei Tsung, Hsinchu (TW);
Yao-Sheng Wang, Hsinchu (TW);
Chih-Wei Chen, Hsinchu (TW);
Chih-Wen Goo, Hsinchu (TW);
Yu-Cheng Tseng, Hsinchu (TW);
Ming-En Shih, Hsinchu (TW);
Kuo-Chiang Lo, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 389 days.

(21) Appl. No.: 17/167,356

(22) Filed: Feb. 4, 2021

(65) Prior Publication Data

US 2021/0287340 A1    Sep. 16, 2021

Related U.S. Application Data

(60) Provisional application No. 62/987,960, filed on Mar. 11, 2020.

(51) Int. Cl.
*G06T 3/40* (2006.01)
*G06N 3/04* (2023.01)
(Continued)

(52) U.S. Cl.
CPC .......... *G06T 3/4053* (2013.01); *G06F 18/214* (2023.01); *G06N 3/04* (2013.01);
(Continued)

(58) Field of Classification Search
CPC ........ G06F 18/214; G06N 3/04; G06N 3/045; G06N 3/063; G06N 3/08; G06T 3/4046;
(Continued)

(56) References Cited

U.S. PATENT DOCUMENTS

2017/0316548 A1\* 11/2017 Zhang .................. G06V 10/764
2019/0206026 A1\* 7/2019 Vemulapalli ............ G06T 7/248
(Continued)

FOREIGN PATENT DOCUMENTS

| CN | 109785235 | * 5/2019 | ............. G06T 11/00 |
| CN | 110796594 A | 2/2020 | |

*Primary Examiner* — Zhiyu Lu
(74) *Attorney, Agent, or Firm* — Tong J. Lee

(57) ABSTRACT

A video processing circuit includes an input buffer, an online adaptation circuit, and an artificial intelligence (AI) super-resolution (SR) circuit. The input buffer receives input low-resolution (LR) frames and high-resolution (HR) frames from a video source over a network. The online adaptation circuit forms training pairs, and calculates an update to representative features that characterize the input LR frames using the training pairs. Each training pair formed by one of the input LR frames and one of the HR frames. The AI SR circuit receives the input LR frames from the input buffer and the representative features from the online adaptation circuit. Concurrently with calculating the update to the representative features, the AI SR circuit generates SR frames for display from the input LR frames based on the representative features. Each SR frame has a higher resolution than a corresponding one of the input LR frames.

18 Claims, 5 Drawing Sheets

(51) Int. Cl.
  *H04L 65/75* (2022.01)
  *G06F 18/214* (2023.01)
  *G06V 10/764* (2022.01)
  *G06V 10/774* (2022.01)
  *G06V 20/40* (2022.01)

(52) U.S. Cl.
  CPC .......... *G06T 3/4046* (2013.01); *G06T 3/4076* (2013.01); *G06V 10/764* (2022.01); *G06V 10/774* (2022.01); *G06V 20/41* (2022.01); *H04L 65/75* (2022.05)

(58) Field of Classification Search
  CPC ... G06T 3/4053; G06T 3/4076; G06V 10/764; G06V 10/774; G06V 20/41; H04L 65/75
  See application file for complete search history.

(56) References Cited

U.S. PATENT DOCUMENTS

| | | | |
|---|---|---|---|
| 2019/0287216 A1* | 9/2019 | Liu | G06T 3/4061 |
| 2020/0364556 A1* | 11/2020 | Irani | G06N 3/08 |
| 2020/0389672 A1* | 12/2020 | Kennett | H04N 19/86 |
| 2021/0097646 A1* | 4/2021 | Choi | G06T 5/50 |
| 2021/0192687 A1 | 6/2021 | Liu et al. | |

* cited by examiner

ONLINE AI SUPER RESOLUTION ENGINE AND OPERATIONS

CROSS-REFERENCE TO RELATED APPLICATIONS

This application claims the benefit of U.S. Provisional Application No. 62/987,960 filed on Mar. 11, 2020, the entirety of which is incorporated by reference herein.

TECHNICAL FIELD

Embodiments of the invention relate to an edge device with image enhancement capability for performing super-resolution operations.

BACKGROUND

Modern image display devices can stream a video over a network and enhance the streamed content before displaying the content. Some devices can perform super-resolution (SR) operations with image enhancement on the streamed content. Super-resolution refers to the task of up-scaling a low resolution (LR) image to an image of a higher resolution; e.g., from an input image of (720×480) pixels to an output image of (3840×2160) pixels. Conventional image resizing techniques that are based on up/down-sampling can degrade image quality with respect to the amount of blurring, noise, distortion, color condition, sharpness, contrast, etc.

A typical edge device, such as a television or a smartphone, has limited computing power due to strict requirements on power consumption and thermal performance. Thus, image enhancement operations on an edge device are typically based on algorithms and parameters pre-configured by the device manufacturer. There is limited flexibility in adjusting the pre-configuration once the device is in use by a consumer. The limited flexibility can adversely affect output image quality when input images contain diverse contents and quality. Thus, there is a need for improving image enhancement operations to minimize the impact of upscaling on the output image quality.

SUMMARY

In one embodiment, a video processing circuit is provided to include an input buffer, an online adaptation circuit, and an artificial intelligence (AI) super-resolution (SR) circuit. The input buffer receives input low-resolution (LR) frames and high-resolution (HR) frames from a video source over a network. The online adaptation circuit forms training pairs, and calculates an update to representative features that characterize the input LR frames using the training pairs. Each training pair formed by one of the input LR frames and one of the HR frames. The AI SR circuit receives the input LR frames from the input buffer and the representative features from the online adaptation circuit. Concurrently with calculating the update to the representative features, the AI SR circuit generates SR frames for display from the input LR frames based on the representative features. Each SR frame has a higher resolution than a corresponding one of the input LR frames.

In another embodiment, a method is provided for performing SR operations. Input LR frames and HR frames are received from a video source over a network. Training pairs are formed, with each training pair formed by one of the input LR frames and one of the HR frames. An update to representative features is calculated using the training pairs, the representative features characterize the input LR frames. Concurrently with calculating the update to the representative features, SR frames are generated for display from the input LR frames based on the representative features. Each SR frame has a higher resolution than a corresponding one of the input LR frames.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
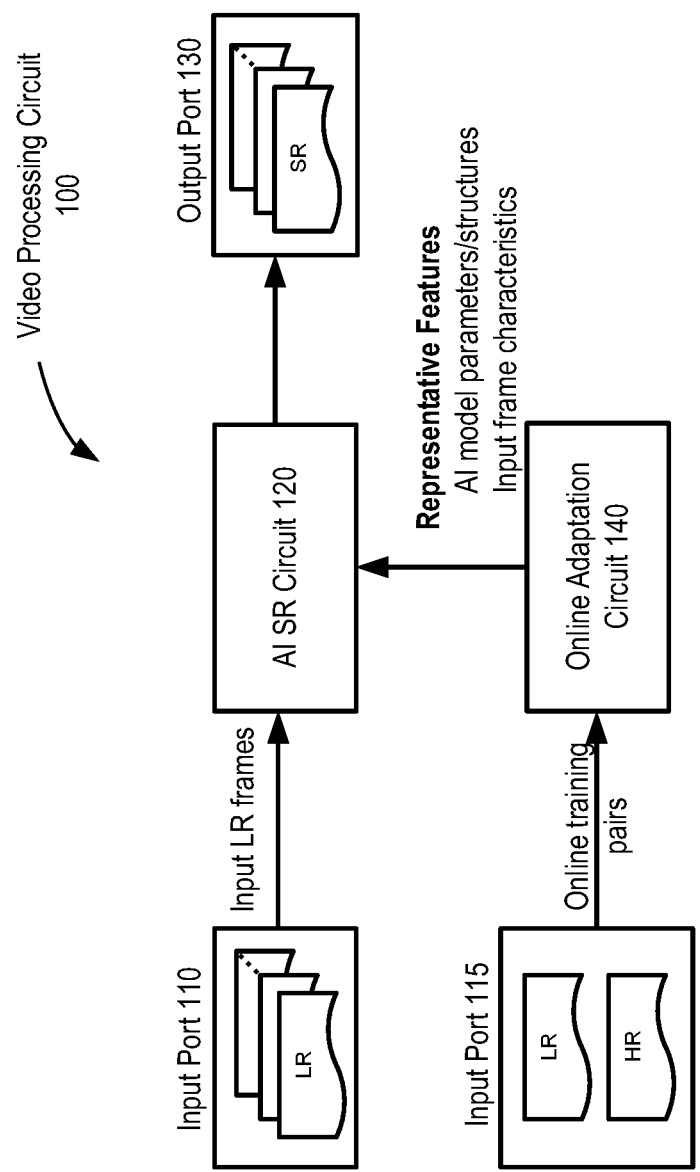
FIG. 1 is a block diagram illustrating a video processing circuit performing SR operations according to an embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a video processing circuit that performs super-resolution (SR) operations on input frames based on online training. The video processing circuit includes a super-resolution (SR) engine that operates on low resolution (LR) input frames using AI models, and generates output frames (referred to as SR frames) with the required resolution. The SR engine, also referred to as an AI SR circuit, can remove artifacts in the input LR frames. Each AI model is defined by characteristics such as parameters, structures, and operators. These characteristics can be updated during runtime based on online training pairs where each training pair includes an LR frame and a high-resolution (HR) frame.

A conventional SR circuit typically relies on pre-trained parameters only. The number of pre-trained parameters may be limited due to limited memory capacity. As a result, a conventional SR circuit may be unable to properly handle different types of input images with different levels of image quality.

The video processing circuit described herein further includes an online adaptation circuit, which identifies representative features from the online training pairs and provides the identified representative features to the AI SR circuit. The video processing circuit may receive the online training pairs and the input LR frames, in parallel, from the same video source via the same communication network. In one embodiment, the online training pairs may be received less frequently than the input LR frames to reduce network bandwidth usage.

Furthermore, the LR frames in the online training pairs may be a subset of the input LR frames; thus, the online training pairs typically have content and quality information more relevant to the input LR frames than pre-trained parameters. When the content and/or quality of the input frames changes, the content and/or quality of the online training pairs also changes accordingly. Thus, the representative features extracted from the online training pairs can provide a hint to what can be done to enhance the input LR frames. For an edge device with limited processing resources and storage capacity (e.g., a smart TV, a smartphone, an IoT device, etc.), the methodology described herein provides great flexibility with respect to training in runtime with minimal computation overhead.

As used herein, the terms "LR" and "HR" are relative to each other; that is, an LR frame has fewer pixels than an HR frame for the same display size (e.g., N square inch). For example, An LR frame may have (720×480) pixels and an HR frame may have (3840×2160) pixels for the same display size. It is understood that an LR frame and an HR frame may have any number of pixels as long as the LR frame has fewer pixels than the HR frame for the same display size. The resolution of an SR frame is higher than the resolution of an LR frame, and maybe the same as, or lower than that of an HR frame.

FIG. 1 is a block diagram illustrating a video processing circuit 100 according to one embodiment. The video processing circuit 100 may be part of a device, also referred to as an edge device. Examples of the device may include: a television, a smartphone, a computing device, a network-connected device, a gaming device, an entertainment device, an Internet-of-things (IoT) device, or any device capable of processing and displaying images and/or videos.

In one embodiment, the video processing circuit 100 includes, among other components, an AI SR circuit 120 coupled to an online adaptation circuit 140. The AI SR circuit 120 is further coupled to an input port 110 to receive input frames of low resolution (i.e., input LR frames). The AI SR circuit 120 may perform SR operations on the input LR frames according to one or more AI models. An example of the AI model is an artificial neural network, such as a convolutional neural network (CNN) or another machine learning or deep learning network. Examples of the SR operations performed by the AI SR circuit 120 include, but are not limited to: CNN operations, machine learning operations, or deep learning operations. For each input LR frame, the AI SR circuit 120 generates an output frame of higher resolution, referred to as an SR frame. The AI SR circuit 120 outputs SR frames to an output port 130. The SR frames may be sent to a display to be viewed by a user.

In one embodiment, the online adaptation circuit 140 is coupled to another input port 115 to receive online training pairs. Each online training pair includes an LR frame and a corresponding HR frame. The LR frame may be one of the input LR frames processed by the AI SR circuit 120 for generating SR frames. In one embodiment, the LR frames in the online training pairs may be a subset of the input LR frames. In one embodiment, the AI SR circuit 120 and the online adaptation circuit 140 may receive their respective LR frames in parallel.

The online adaptation circuit 140 uses online training pairs to perform online training. In one embodiment, the online adaptation circuit 140 may identify (e.g., detect or extract) representative features from the online training pairs, and provide the representative features to the AI SR circuit 120 to improve the performance of the SR operations. The online adaptation circuit 140 may perform the online training in parallel with the SR operations performed by the AI SR circuit. The online adaptation circuit 140 may perform non-AI computations to detect some of the representative features and/or AI operations (e.g., CNN operations, machine learning operations, or deep learning operations) to detect some of the representative features.

In one embodiment, the representative features may indicate characteristics of the input LR frames, where the characteristics may include but are not limited to: a scene type, a degradation type, a degradation level, a color condition, and other indicators of image content and/or quality. For example, scene types may include a natural scene, a computer-generated (CG) scene, etc.; degradation types and levels may include image noise type and level, video compression parameter, etc.; and color conditions may include color saturation, contrast, sharpness, etc. The representative features may include global features or local features of a frame or a frame sequence, and/or high-level features (e.g., scene type) or low-level features (e.g., noise level) of a frame or a frame sequence.

Additionally or alternatively, the representative features may be updated to indicate updated parameters and/or structures of the AI models used by the AI SR circuit 120 for generating SR frames. The AI SR circuit 120 may update the internal layers of a neural network and/or output characteristics based on the representative features. For example, the updates may be applied to the structure and/or the parameters of feature maps, activation layers, filter kernels, etc. The update may be performed periodically; e.g., per frame or at a fixed period. Alternatively, the update may be performed when a predetermined condition is detected. Examples of the predetermined condition may include but are not limited to: scene change, unstable Internet bandwidth, etc.

Thus, the AI SR circuit 120 can remove artifacts from the input LR frames using the identified representative features that characterize the features in the input LR frames. Furthermore, the AI SR circuit 120 can remove artifacts from the input LR frames using one or more AI models that are updated online based on the representative features obtained from the online training pairs.

Figure 2:
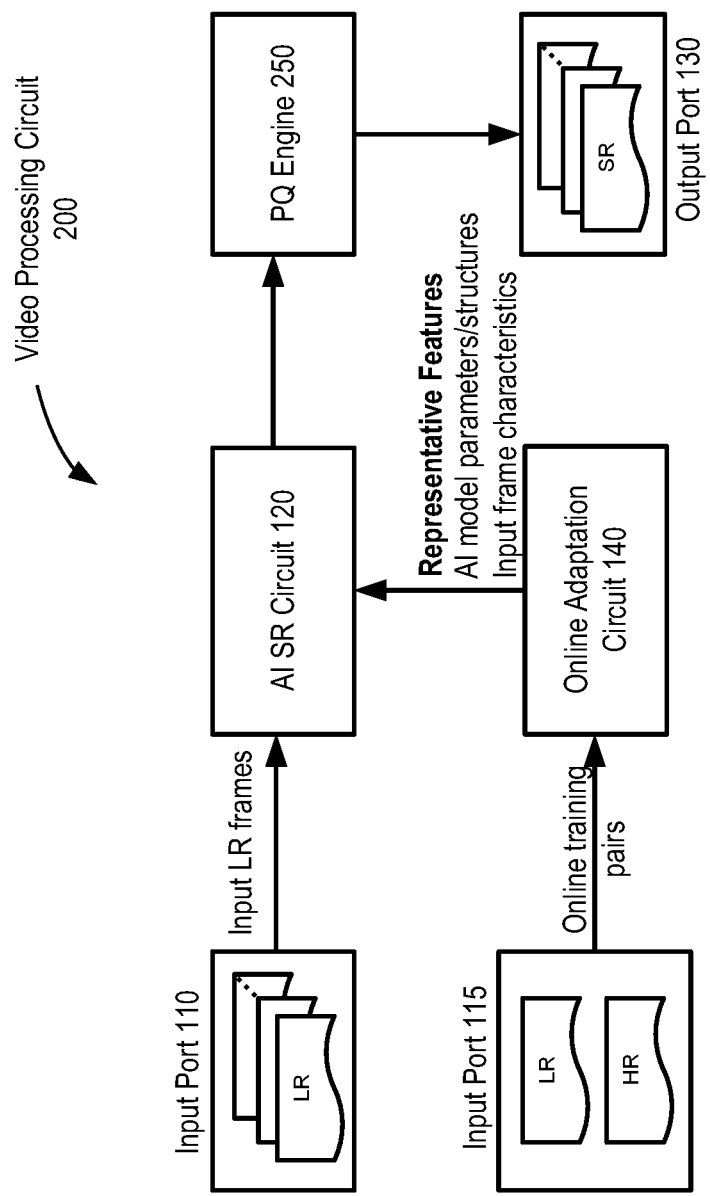
FIG. 2 is a block diagram illustrating a video processing circuit performing SR operations according to another embodiment.

FIG. 2 is a block diagram illustrating a video processing circuit 200 according to another embodiment. The video processing circuit 200 includes the AI SR circuit 120 and the online adaptation circuit 140 in FIG. 1. In this embodiment, the output of the AI SR circuit 120 is coupled to a picture quality (PQ) engine 250 to further enhance the quality of the SR frames generated by the AI SR circuit 120. In one embodiment, the PQ engine 250 performs image enhancement operations including, but not limited to: focus peaking, sharpness enhancement, saturation tone mapping, etc. The output of the PQ engine 250 is coupled to the output port 130, which provides the enhanced SR frames to a display to be viewed by a user.

Figure 3:
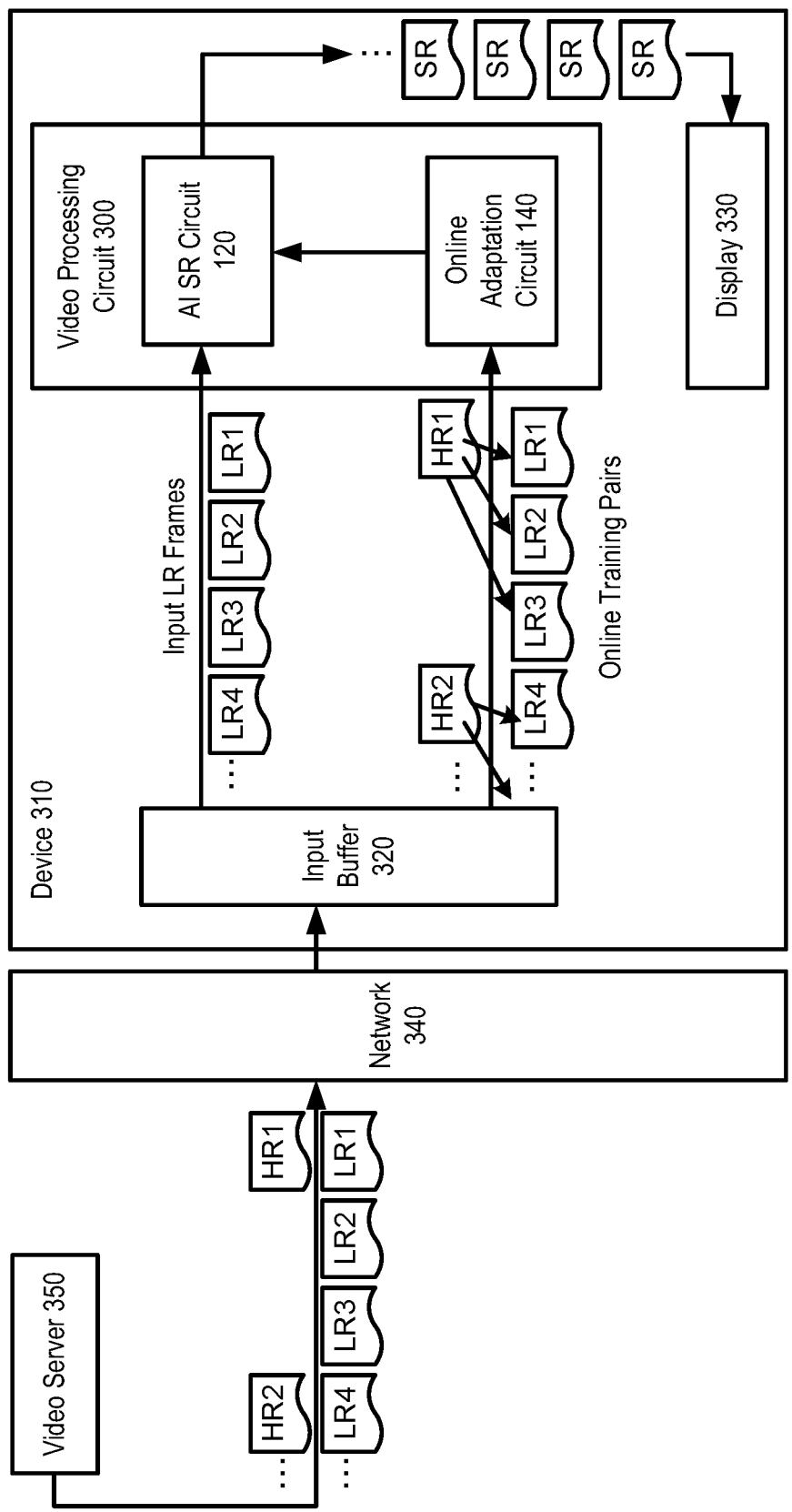
FIG. 3 illustrates a device that forms and uses online training pairs according to one embodiment.

FIG. 3 is a block diagram illustrating a device 310 including a video processing circuit 300 according to one embodiment. The video processing circuit 300 may be an example of the video processing circuit 100 in FIG. 1 or the video processing circuit 200 in FIG. 2. The video processing circuit 300 is coupled to an input buffer 320 and a display 330. The device 310 receives an input video from a video server 350 via a communication network 340. The video server 350 provides a video streaming service for videos in multiple resolutions selectable by the device 310 (e.g., a user of the device 310). In the example of FIG. 3, the device 310 chooses to stream a video in two resolutions; i.e., LR frames and HR frames. The device 310 may configure the streaming operation such that HR frames are received less frequently than the LR frames. In one embodiment, the device 310 may receive the HR frames periodically; e.g., at a predetermined fixed time period. Alternatively, the device may receive the HR frames when detecting an event, such as scene change, when the available network bandwidth exceeds a threshold, or another event. The device 310 may receive one or more HR frames at a fixed time period or when an aforementioned event is detected. Alternatively, the device 310 may receive a predetermined number of consecutive HR frames at a fixed time period or when an aforementioned event is detected.

In the example of FIG. 3, two HR frames (HR1 and HR2) and four LR frames (LR1, LR2, LR3, and LR4) are received during the same time period. HR1 and LR1 may have the same content with different resolutions. The term "content(s)" herein refers to the scene, image objects, and backgrounds, etc. HR1 and LR2 may have similar or different contents (e.g., HR1 contains the image of a cat and LR2 contains the image of a house) with different resolutions. Likewise, HR1 and LR3 may have similar or different contents with different resolutions. In this example, HR1 can be paired with three LR frames to form three training pairs; e.g., (HR1, LR1), (HR1, LR2), and (HR1, LR3), regardless of the degree of similarity or differences in contents between the HR frame and the LR frame in each training pair. The same applies to HR2, which can be paired with one or more LR frames to form one or more training pairs. As an HR frame contains information of higher quality and details than an LR frame, a training pair can be effective in training regardless of the respective contents in the HR frame and the LR frame forming the training pair.

A training pair includes a corresponding pair of an HR frame and an LR frame. Training pairs disclosed herein are "online training pairs," as the training is performed concurrently with SR generation, where the training uses input LR frames (and the corresponding HR frames) and the SR generation generates SR frames having the same content as the input LR frames with improved resolution. More specifically, when the AI SR circuit 120 processes the input LR frames (e.g., LR1-LR4) for display, the online adaptation circuit 140 concurrently performs training (e.g., identifying or updating the representative features) using the same input LR frames paired with the corresponding HR frames. During the video streaming process, the online adaptation circuit 140 may continuously calculate updates to the representative features and outputs the updated representative features to the AI SR circuit 120. In some embodiments, the representative features calculated from input frames (e.g., LR1-LR4 and HR1-HR2) by the online adaptation circuit 140 may be received by the AI SR circuit 120 after LR1-LR4 are processed into SR frames. That is, the AI SR circuit 120 may generate the SR frames from LR1-LR4 based on the representative features calculated from those input frames prior to LR1-LR4 and HR1-HR2.

In one embodiment, the device 310 uses the input buffer 320 to buffer the frames received from the network 340. The input buffer 320 may buffer the received LR frames and HR frames. The corresponding LR frame and HR frame form an online training pair, which is sent from the input buffer 320 to the online adaptation circuit 140. The input buffer 320 further sends the LR frames, including those LR frames in the online training pairs, to the AI SR circuit 120 as the input LR frames. In this example, the LR frames in the online training pairs are a subset of the input LR frames.

Since the device 310 obtains the online training pairs and the input LR frames from the same video source via the same communication network path, the representative features identified from the online training pairs provide a strong indication of the features in the input LR frames, as well as the structures/parameters of the AI models best suited for the SR operations.

In some embodiments, the video processing circuit 300 may be an AI processor, a graphics processing unit (GPU), an Application Specific Integrated Circuit (ASIC), or another general-purpose or special-purpose processing circuit. In one embodiment, the AI processor may be operative to perform CNN computations for detecting the representative feature and processing a current frame. In one embodiment, the video processing circuit 300 may be implemented as a system-on-a-chip (SoC). In some embodiments, the video processing circuit 300 may be implemented in more than one chip in the same electronic device.

In one embodiment, the AI SR circuit 120 includes a CNN accelerator to perform CNN operations on the input LR frames. The CNN accelerator includes hardware components specialized for accelerating neural network operations by convolutional operations, fully-connected operations, activation, pooling, normalization, element-wise mathematical computations, etc. In some embodiments, the CNN accelerator includes multiple compute units and memory (e.g., Static Random Access Memory (SRAM)), where each compute unit further includes multipliers and adder circuits, among others, for performing mathematical operations such as multiply-and-accumulate (MAC) operations to accelerate the convolution, activation, pooling, normalization, and other neural network operations. The CNN accelerator may perform fixed and floating-point neural network operations. The CNN accelerator may perform SR operations to output SR frames with enhanced image quality.

In one embodiment, the AI SR circuit 120 performs CNN operations according to a CNN model (which is an example of an AI model). The CNN operations include, among other things, a convolution of an input feature map with a kernel filter. For example, an input feature map from a previous layer of the CNN operations may be convolved with a kernel filter to generate an output feature map to the next layer. The characteristic of the AI model, such as the layered structure of the neural network and the parameters of kernel filters, may be updated by the outcome of online training generated by the online adaptation circuit 120.

Figure 4:
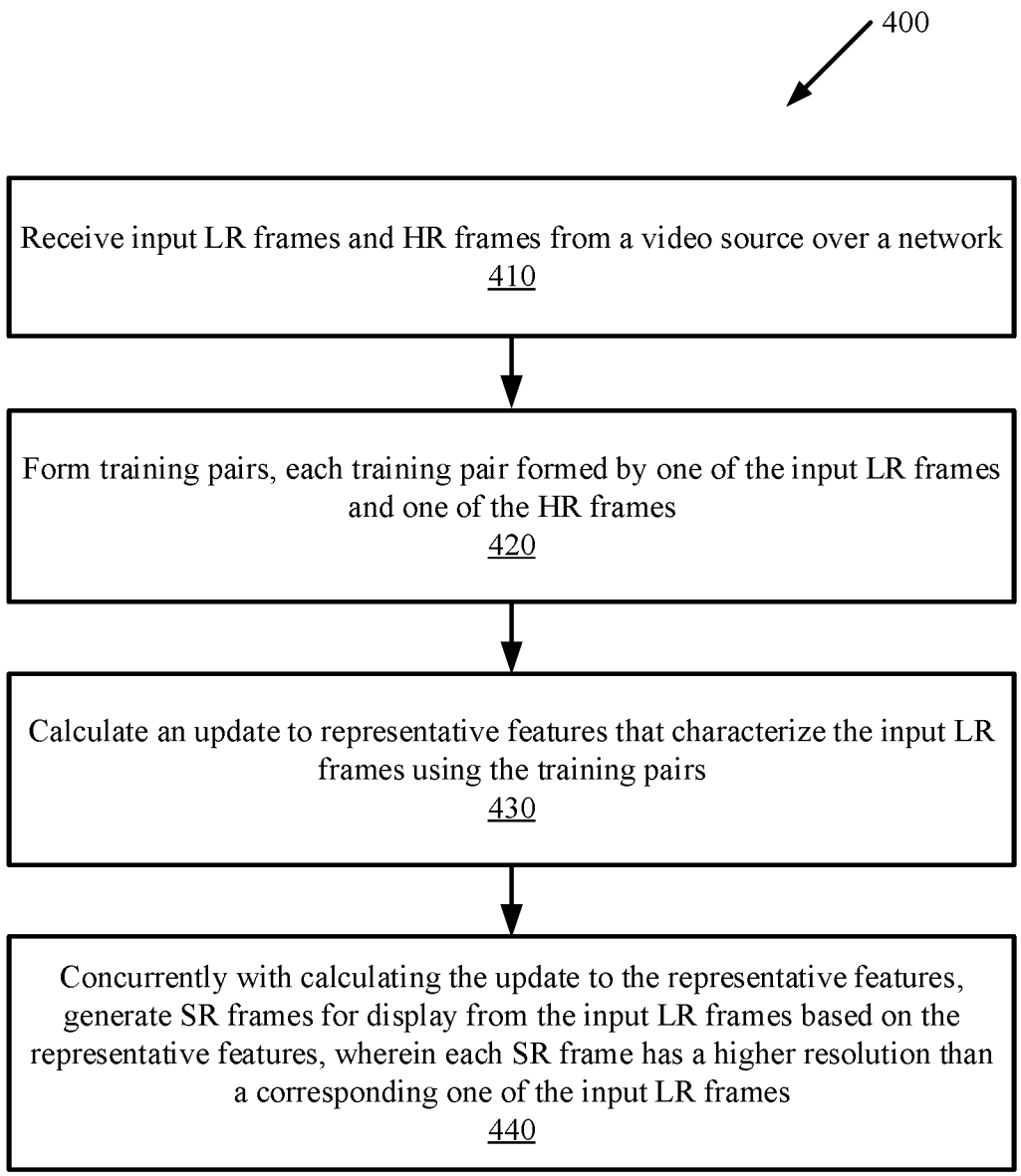
FIG. 4 is a flow diagram illustrating a method for performing SR operations according to one embodiment.

FIG. 4 is a flow diagram illustrating a method 400 for performing SR operations according to one embodiment. For example, the method 400 may be performed by any of the embodiments described in connection with FIGS. 1, 2, 3, and 5. It is understood that the embodiments are for illustrative purposes only; other devices or circuits with video processing capabilities may perform the method 400.

The method 400 begins at step 410 when a video processing circuit receives input LR frames and HR frames from a video source over a network. The video processing circuit at step 420 forms training pairs, with each training pair formed by one of the input LR frames and one of the HR frames. The video processing circuit at step 430 calculates an update to representative features that characterize the input LR frames using the training pairs. Concurrently with calculating the update to the representative features, the video processing circuit at step 440 generates SR frames for display from the input LR frames based on the representative features. Each SR frame has a higher resolution than a corresponding one of the input LR frames.

In one embodiment, the representative features include one or more of: a scene type, a degradation type, a degradation level, and a color condition. In one embodiment, the representative features include information for the AI SR circuit to update a characteristic of an AI model used for generating the SR frames.

In one embodiment, the HR frames may be received less frequently than the input LR frames. In one embodiment, one or more of the training pairs includes an HR frame and an LR frame with different contents in addition to different resolutions.

In one embodiment, the video processing circuit includes an AI SR circuit and an online adaptation circuit. The online adaptation circuit is operative to identify the representative features using a CNN. The AI SR circuit is operative to generate the SR frames using a CNN. The online adaptation circuit may receive the HR frames periodically, and may pair each HR frame with multiple ones of the input LR frames to form multiple training pairs. The online adaptation circuit may receive an HR frame when detecting an event, which may include a scene change or available network bandwidth exceeding a threshold. The AI SR circuit, when detecting a condition, may update an AI model used for generating the SR frames. The condition may include one of: unstable network bandwidth, scene change, fixed time periods, and per frame time.

Figure 5:
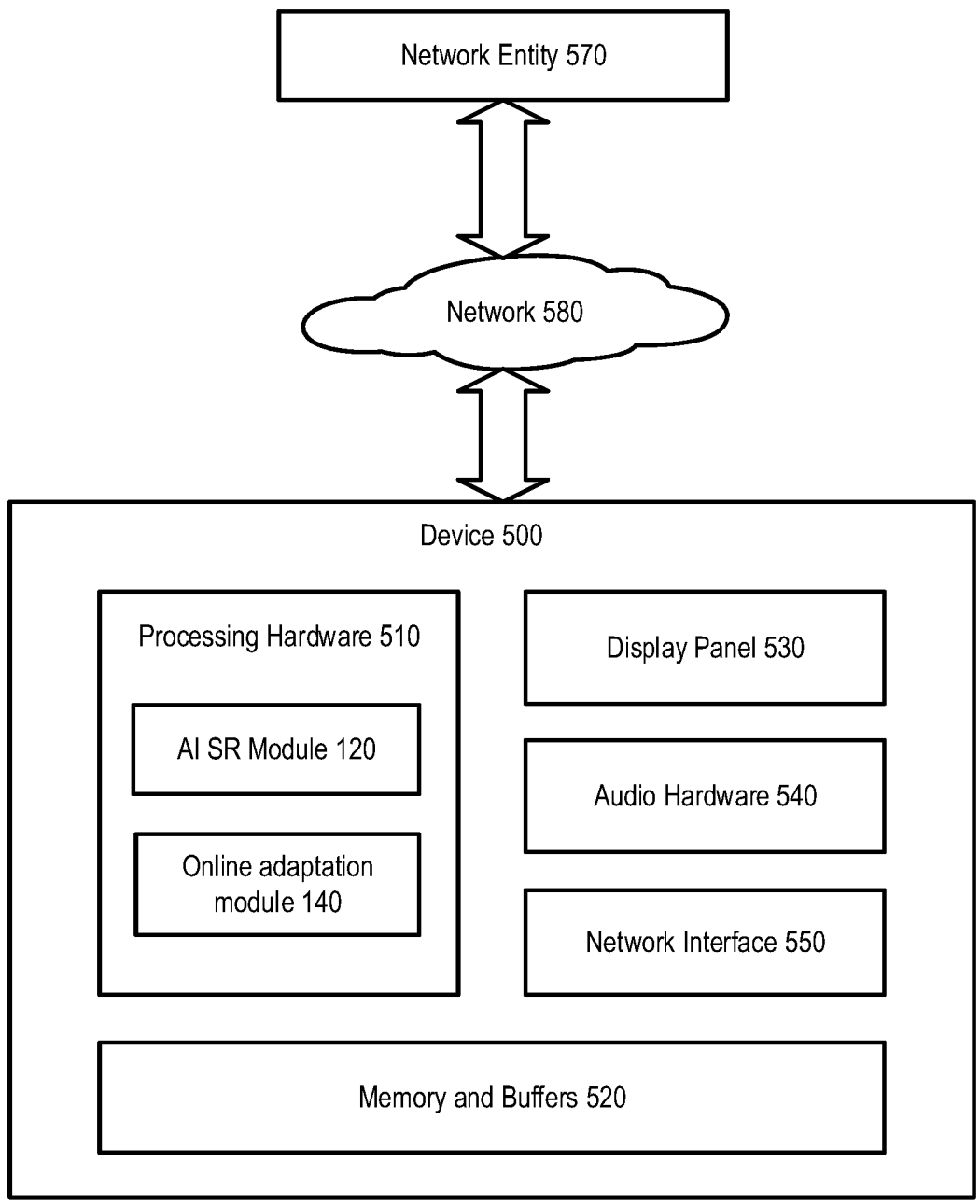
FIG. 5 illustrates an example of a device operative to perform SR operations according to one embodiment.

FIG. 5 illustrates an example of a device 500 according to one embodiment. One example of the device 500 is a television, which receives a video with low resolution (e.g., 720×480 pixels) and performs SR operations to scale up the video to a higher resolution (e.g., 3840×2160 pixels) for display on the television screen. Alternatively, the device 500 may be a smartphone, a computing device, a network-connected device, a gaming device, an entertainment device, an Internet-of-things (IoT) device, or any device capable of processing and displaying images and/or videos.

The device 500 includes processing hardware 510, which may include any one of the video processing circuits 100, 200, and 300 in FIGS. 1, 2, and 3, respectively. In one embodiment, the processing hardware 510 may include one or more processors, such as one or more of: a central processing unit (CPU), a GPU, a digital processing unit (DSP), an AI processor, a multimedia processor, other general-purpose and/or special-purpose processing circuitry. In one embodiment, the processing hardware 510 may include a hardware accelerator, such as a CNN accelerator. In one embodiment, the processing hardware 510 includes the AI SR circuit 120 and the online adaptation circuit 140 in the aforementioned embodiments.

The device 500 further includes memory and buffers 520 coupled to the processing hardware 510. In one embodiment, the memory and buffers 520 may include the input buffer 320 in FIG. 3. The memory and buffers 520 may include memory devices such as dynamic random access memory (DRAM), SRAM, flash memory, and other non-transitory machine-readable storage media; e.g., volatile or non-volatile memory devices. The memory and buffers 520 may further include storage devices, for example, any type of solid-state or magnetic storage device. In some embodiments, the memory and buffers 520 may store instructions which, when executed by the processing hardware 510, cause the processing hardware 510 to perform the aforementioned operations for generating SR frames, such as the method 400 of FIG. 4.

The device 500 may also include a display panel 530 to display information such as images, videos, messages, Web pages, games, texts, and other types of text, image, and video data. The device 500 may also include audio hardware 540, such as a microphone and a speaker, for receiving and generating sounds.

In some embodiments, the device 500 may also include a network interface 550 to connect to a wired and/or wireless network for transmitting and/or receiving voice, digital data and/or media signals. It is understood the embodiment of FIG. 5 is simplified for illustration purposes. Additional hardware components may be included.

The operations of the flow diagram of FIG. 4 have been described with reference to the exemplary embodiments of FIGS. 1, 2, 3, and 5. However, it should be understood that the operations of the flow diagram of FIG. 4 can be performed by embodiments of the invention other than the embodiments of FIGS. 1, 2, 3, and 5, and the embodiments of FIGS. 1, 2, 3, and 5 can perform operations different than those discussed with reference to the flow diagram. While the flow diagram of FIG. 4 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A video processing circuit comprising:
   an input buffer to receive input low-resolution (LR) frames and high-resolution (HR) frames in a video stream from a video source over a network, wherein the HR frames are received less frequently than the LR frames;
   an online adaptation circuit operative to:
      form training pairs, each training pair formed by one of the input LR frames and one of the HR frames in the video stream; and
      calculate an update to representative features that characterize the input LR frames using the training pairs; and
   an artificial intelligence (AI) super-resolution (SR) circuit operative to:
      receive the input LR frames from the input buffer and the representative features from the online adaptation circuit;
      update an AI model based on the update to the representative features; and
      concurrently with the representative features being updated, generate SR frames for display from the input LR frames in the video stream using the AI model, wherein each SR frame has a higher resolution than a corresponding one of the input LR frames.

2. The video processing circuit of claim 1, wherein the representative features include one or more of: a scene type, a degradation type, a degradation level, and a color condition.

3. The video processing circuit of claim 1, wherein the representative features include information for the AI SR circuit to update a characteristic of the AI model used for generating the SR frames.

4. The video processing circuit of claim 1, wherein one or more of the training pairs includes an HR frame and an LR frame with different contents in addition to different resolutions.

5. The video processing circuit of claim 1, wherein the online adaptation circuit is operative to:
identify the representative features using a convolutional neural network (CNN).

6. The video processing circuit of claim 1, wherein the AI SR circuit is operative to:
generate the SR frames using a convolutional neural network (CNN).

7. The video processing circuit of claim 1, wherein the online adaptation circuit is operative to:
receive the HR frames periodically; and
pair each HR frame with multiple ones of the input LR frames to form multiple training pairs.

8. The video processing circuit of claim 1, wherein the online adaptation circuit is operative to:
receive one or more of the HR frames when detecting an event, wherein the event includes a scene change or available network bandwidth exceeding a threshold.

9. The video processing circuit of claim 1, wherein the AI SR circuit, when detecting a condition, is operative to update an AI model used for generating the SR frames, wherein the condition includes one of: unstable network bandwidth, scene change, fixed time periods, and per frame time.

10. A method for performing super-resolution (SR) operations, comprising:
receiving input low-resolution (LR) frames and high-resolution (HR) frames in a video stream from a video source over a network, wherein the HR frames are received less frequently than the LR frames;
forming training pairs, each training pair formed by one of the input LR frames and one of the HR frames in the video stream;
calculating an update to representative features that characterize the input LR frames using the training pairs;
update an artificial intelligence (AI) model based on the update to the representative features; and
concurrently with the representative features being updated, generating SR frames for display from the input LR frames in the video stream using the AI model, wherein each SR frame has a higher resolution than a corresponding one of the input LR frames.

11. The method of claim 10, wherein the representative features include one or more of: a scene type, a degradation type, a degradation level, and a color condition.

12. The method of claim 10, wherein the representative features include information for updating a characteristic of the AI model used for generating the SR frames.

13. The method of claim 10, wherein one or more of the training pairs includes an HR frame and an LR frame with different contents in addition to different resolutions.

14. The method of claim 10, wherein the representative features are identified using a convolutional neural network (CNN).

15. The method of claim 10, wherein the SR frames are generated using a convolutional neural network (CNN).

16. The method of claim 10, wherein forming the training pairs further comprises:
receiving the HR frames periodically; and
pairing each HR frame with multiple ones of the input LR frames to form multiple training pairs.

17. The method of claim 10, wherein forming the training pairs further comprises:
receiving one or more of the HR frames when detecting an event, wherein the event includes a scene change or available network bandwidth exceeding a threshold.

18. The method of claim 10, further comprising:
updating an AI model used for generating the SR frames when detecting a condition, wherein the condition includes one of: unstable network bandwidth, scene change, fixed time periods, and per frame time.

* * * * *